United States Patent
Rizzon et al.

(10) Patent No.: US 9,579,968 B2
(45) Date of Patent: Feb. 28, 2017

(54) ONE-WAY VENTED SCREEN ASSEMBLY FOR A WORK VEHICLE

(71) Applicant: CNH America, LLC, New Holland, PA (US)

(72) Inventors: Dominick Rizzon, Leola, PA (US); Jeffrey B. Fay, II, Lititz, PA (US)

(73) Assignee: CNH Industrial America LLC, New Holland, PA (US)

( * ) Notice: Subject to any disclaimer, the term of this patent is extended or adjusted under 35 U.S.C. 154(b) by 586 days.

(21) Appl. No.: 14/013,785

(22) Filed: Aug. 29, 2013

(65) Prior Publication Data

US 2014/0151139 A1   Jun. 5, 2014

Related U.S. Application Data

(60) Provisional application No. 61/731,669, filed on Nov. 30, 2012.

(51) Int. Cl.
*B60K 11/00* (2006.01)
*B60K 11/06* (2006.01)
*B60K 11/08* (2006.01)

(52) U.S. Cl.
CPC ......... *B60K 11/08* (2013.01); *B60Y 2200/221* (2013.01)

(58) Field of Classification Search
CPC ......... B60K 11/00; B60K 11/04; B60K 11/06; B60K 11/08; B60K 11/085
USPC ................................................ 180/68.1–68.4
See application file for complete search history.

(56) References Cited

U.S. PATENT DOCUMENTS

| | | | | |
|---|---|---|---|---|
| 1,335,356 A | * | 3/1920 | Vaughan | B60K 11/085 |
| | | | | 123/41.04 |
| 2,067,639 A | * | 1/1937 | Lett | B60K 11/085 |
| | | | | 12/146 D |
| 2,788,775 A | * | 4/1957 | Steiner | F01P 5/043 |
| | | | | 123/41.46 |
| 3,087,563 A | * | 4/1963 | Fisher | F01P 11/12 |
| | | | | 165/98 |
| 3,401,508 A | | 9/1968 | Keller | |
| 3,786,891 A | * | 1/1974 | Vogelaar | A01D 41/12 |
| | | | | 180/68.4 |
| 4,064,934 A | * | 12/1977 | Kolthoff, Jr. | F28F 27/00 |
| | | | | 123/41.04 |
| 4,160,487 A | | 7/1979 | Kunze et al. | |
| 4,334,573 A | * | 6/1982 | Hackman | E06B 7/32 |
| | | | | 160/180 |

(Continued)

FOREIGN PATENT DOCUMENTS

DE   4228586 A1   8/1993
GB   1475612 A   1/1977

*Primary Examiner* — J. Allen Shriver, II
*Assistant Examiner* — Travis Coolman
(74) *Attorney, Agent, or Firm* — Rickard K. DeMille; Rebecca L. Henkel (57) ABSTRACT

A screen assembly for a work vehicle is disclosed. The screen assembly may generally include a screen defining a plurality of screen openings for receiving an airflow therethrough. In addition, the screen may define a flap opening. The screen assembly may also include a flap pivotally coupled to the screen at the flap opening. The flap may be configured to be moved to a closed position when the airflow through the screen is in a first direction and to an opened position when the airflow through the screen is in a second direction.

18 Claims, 6 Drawing Sheets

(56) References Cited

U.S. PATENT DOCUMENTS

| | | | | |
|---|---|---|---|---|
| 4,339,014 A * | 7/1982 | Berth | B60K 11/08 | 180/68.1 |
| 4,523,657 A * | 6/1985 | Kooyumjian | B60K 11/08 | 160/DIG. 1 |
| 4,750,549 A * | 6/1988 | Ziegler | B60K 11/085 | 160/180 |
| 4,760,891 A * | 8/1988 | Moss | B60K 11/08 | 180/65.51 |
| 4,909,004 A * | 3/1990 | Panttila | E06B 9/521 | 160/114 |
| 4,924,826 A * | 5/1990 | Vinson | F02B 77/11 | 123/195 C |
| 5,215,157 A * | 6/1993 | Teich | B62D 25/10 | 180/312 |
| 5,547,422 A * | 8/1996 | Seboldt | D06F 58/20 | 34/235 |
| 5,595,537 A | 1/1997 | Jungemann et al. | | |
| 5,785,139 A * | 7/1998 | Freedy | B60K 11/04 | 180/68.1 |
| 6,435,264 B1 * | 8/2002 | Konno | B60K 11/04 | 123/41.49 |
| 6,750,623 B1 * | 6/2004 | McCauley | F01P 7/044 | 318/260 |
| 8,490,730 B2 * | 7/2013 | Ringer | F16J 12/00 | 180/68.1 |
| 2003/0066209 A1 * | 4/2003 | Takezaki | B60K 11/08 | 37/197 |
| 2004/0216934 A1 * | 11/2004 | Tomiyama | B60K 11/04 | 180/68.1 |
| 2006/0118281 A1 * | 6/2006 | Radke | B60K 11/08 | 165/119 |
| 2008/0136357 A1 * | 6/2008 | Beck | F01P 11/12 | 318/280 |
| 2008/0283220 A1 * | 11/2008 | Martin | F01P 11/12 | 165/95 |
| 2008/0289794 A1 * | 11/2008 | Leitch | B60K 11/04 | 165/41 |
| 2009/0130968 A1 * | 5/2009 | Harich | B60K 11/085 | 454/148 |
| 2013/0146377 A1 * | 6/2013 | Adamson | B60K 11/06 | 180/68.1 |

* cited by examiner

ONE-WAY VENTED SCREEN ASSEMBLY FOR A WORK VEHICLE

CROSS-REFERENCE TO RELATED APPLICATIONS

This application is based upon and claims priority to U.S. Provisional Application No. 61/731,669, filed on Nov. 30, 2012, the disclosure of which is hereby incorporated by reference herein in its entirety for all purposes.

FIELD OF THE INVENTION

The present subject matter relates generally to work vehicles and, more particularly, to a one-way vented screen assembly for a work vehicle.

BACKGROUND OF THE INVENTION

Current cooling systems for work vehicles, such as tractors, generally include one or more heat exchangers and a fan configured to pull air through the heat exchanger(s) from a location outside the work vehicle. Typically, these cooling systems are only designed to work in one direction, whereby the fan generates an airflow that is directed into the work vehicle through its front grille or screen and is exhausted from the work vehicle at its rear. However, as is generally understood, work vehicles often operate in fields and other harvesting environments in which the ambient air contains large amounts of dust, plant material and other debris. As a result, the front screen can often become blocked or clogged with debris, thereby preventing air from flowing into the work vehicle and through the heat exchanger(s).

To address this issue, cooling systems have been designed with reversible fans that are capable of generating an airflow that is directed back through the heat exchanger(s) and out the front screen, thereby knocking loose or otherwise clearing out any debris stuck in the screen. Unfortunately, any debris contained within the cooling package (e.g., any debris sucked up under the hood during operation) remains trapped within the work vehicle.

Accordingly, a work vehicle having one-way vented screen assemblies that allow for debris contained under the hood to be expelled from the vehicle would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a screen assembly for a work vehicle. The screen assembly may generally include a screen defining a plurality of screen openings for receiving an airflow therethrough. In addition, the screen may define a flap opening. The screen assembly may also include a flap pivotally coupled to the screen at the flap opening. The flap may be configured to be moved to a closed position when the airflow through the screen is in a first direction and to an opened position when the airflow through the screen is in a second direction.

In another aspect, the present subject matter is directed to a work vehicle including a hood enclosure extending between a forward end and an aft end and a front screen disposed at the forward end of the hood enclosure. The work vehicle may also include a heat exchanger positioned behind the front screen and a fan configured to generate an airflow in both a first direction, wherein air is drawn into the hood enclosure through the front screen and flows through the heat exchanger, and a second direction, wherein air is directed through the heat exchanger and out of the hood enclosure through the front screen. In addition, the work vehicle may include a flap movable relative to the front screen. The flap may be configured to be in a closed position when the airflow is directed in the first direction and an opened position when the airflow is directed in the second direction In a further aspect, the present subject matter is directed to a work vehicle including a hood enclosure extending between a forward end and an aft end and a screen assembly coupled to the hood enclosure. The screen assembly may include a screen defining a plurality of screen openings for receiving an airflow therethrough and a flap movable relative to the screen. In addition, the work vehicle may include a fan configured to generate an airflow in both a first direction, wherein air is drawn into the hood enclosure through the screen and a second direction, wherein air is expelled from the hood enclosure through the screen. The flap may be configured to be in a closed position when the airflow is directed through the screen in the first direction and an opened position when the airflow is directed through the screen in the second direction.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a one-way vented screen assembly for a work vehicle. Specifically, in several embodiments, a front screen flap may be pivotally coupled to the front screen of the work vehicle such that the screen flap is movable between a closed position, where the screen flap is sealed or otherwise disposed adjacent to the front screen, and an opened position, where the screen flap is spaced apart from the front screen. Additionally, an auxiliary screen flap may be pivotally coupled to an auxiliary screen of the work vehicle (e.g., a screen located along the side and/or the bottom of the hood enclosure of the work vehicle) such that the auxiliary screen flap is movable between a closed position, where the auxiliary screen flap is sealed or otherwise disposed adjacent to the auxiliary screen, and an opened position, where the auxiliary screen flap is spaced apart from the auxiliary screen. Thus, when an airflow is being directed into the hood enclosure via the front screen and exiting the hood enclosure via the auxiliary screen, the front screen flap may be moved to the closed position to prevent debris from entering the hood enclosure and the auxiliary screen flap may be moved to the opened position to allow debris contained within the hood enclosure to be expelled therefrom. However, when the airflow through the hood enclosure is reversed (i.e., so that air flows from the auxiliary screen to the front screen), the auxiliary screen flap may be moved to the closed position to prevent debris from entering the hood enclosure and the front screen flap may be moved to the opened position to allow debris contained within the hood enclosure to be expelled therefrom. As such, regardless of the direction of the airflow through the hood enclosure, debris may be vented from within the work vehicle.

Figure 1:
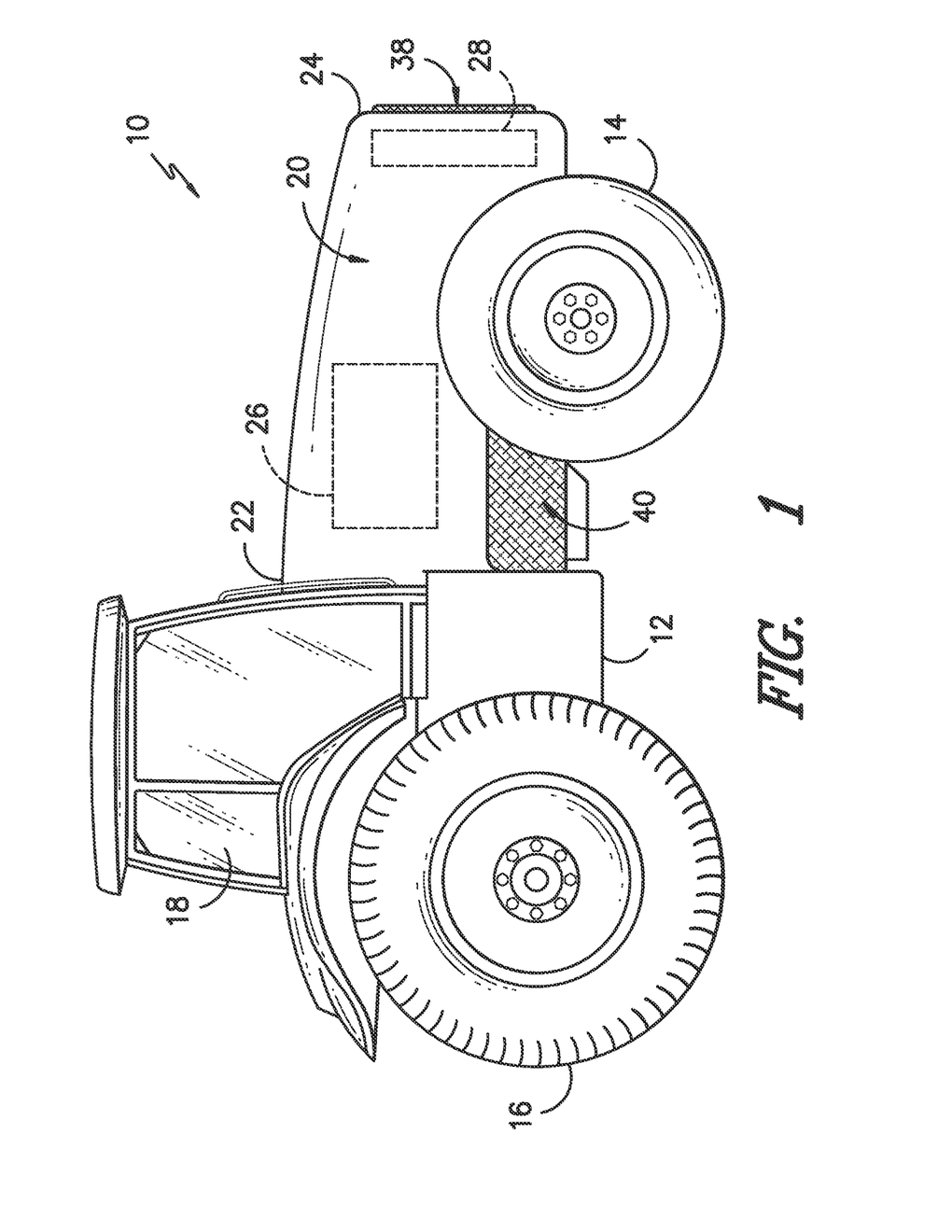
FIG. 1 illustrates a side view of one embodiment of a work vehicle.
Figure 2:
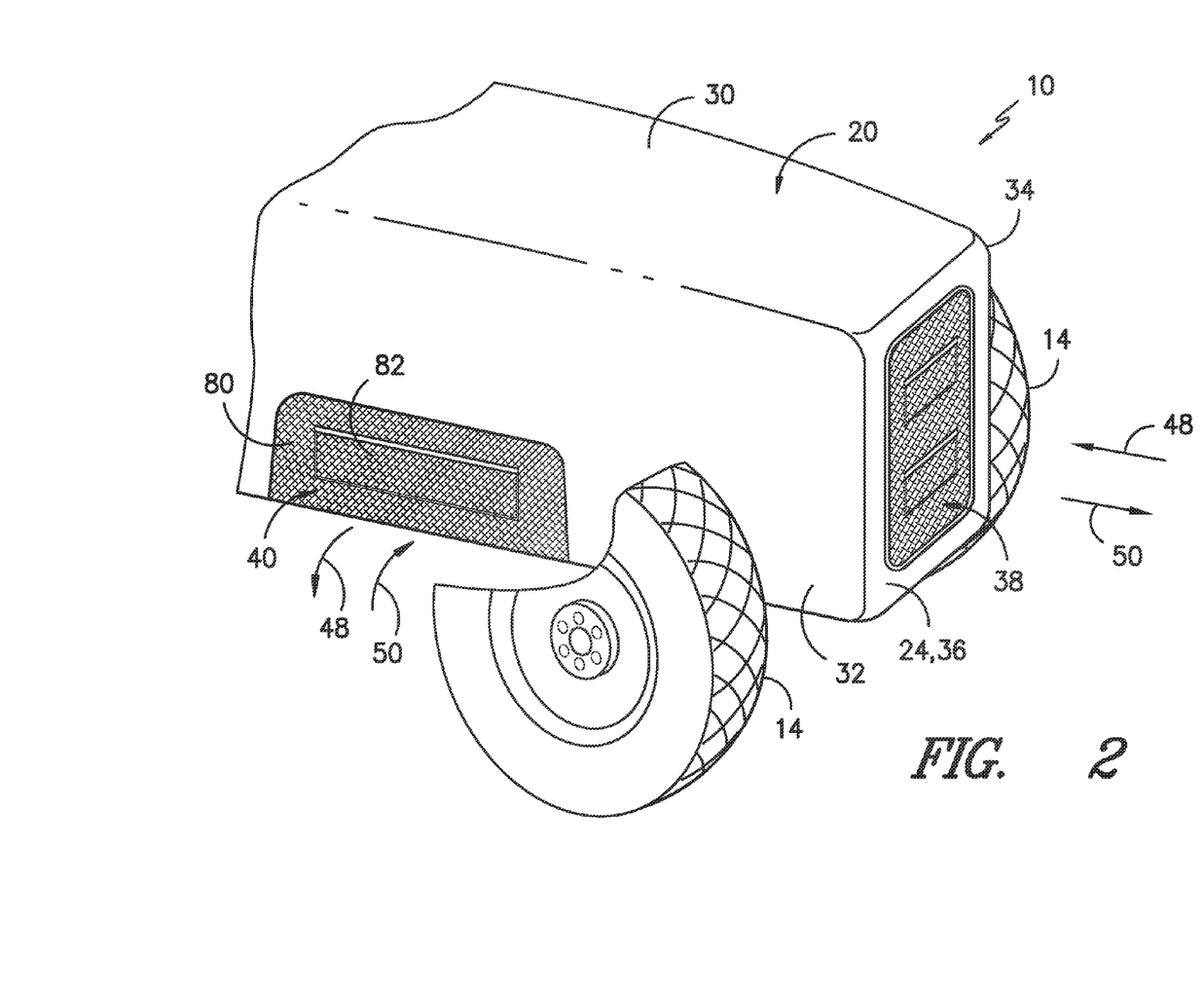
FIG. 2 illustrates a partial, front perspective view of a hood enclosure of the work vehicle shown in FIG. 1.

Referring now to the drawings, FIGS. 1 and 2 illustrate one embodiment of a work vehicle 10 in accordance with aspects of the present subject matter. In particular, FIG. 1 illustrates a side view of the work vehicle 10 and FIG. 2 illustrates a partial, front perspective view of a front portion of the work vehicle 10. It should be appreciated that, although the work vehicle 10 illustrated herein is configured as an agricultural tractor, the work vehicle 10 may generally be configured as any suitable work vehicle known in the art, such as various other agricultural vehicles, earth-moving vehicles, road vehicles, loaders and/or the like.

As shown, the work vehicle 10 generally includes a chassis or frame 12 that is supported by a pair of rear wheels 14 and a pair of front wheels 16, with the rear wheels 14 and/or front wheels 16 being configured as drive wheels. An operator's compartment or cab 18 may be supported along a rear portion of the frame 12 and a hood enclosure 20 may be supported along a front portion of the frame 12. The hood enclosure 20 may generally extend between an aft end 22 disposed adjacent to the cab 18 and a forward end disposed at the front of the work vehicle 10 so as to least partially surround and/or cover an engine 26 and a cooling system 28 of the work vehicle 10.

As particularly shown in FIG. 2, the hood enclosure 20 may generally include a top wall 30, a first sidewall 32 and a second sidewall 34 extending between its forward and aft ends 22, 24. In addition, the hood enclosure 20 may include a front wall 36 disposed at its forward end 24. The hood enclosure 20 may also include a front screen assembly 38 forming all or a portion of the front wall 36 and one or more auxiliary screen assemblies 40 spaced apart from the front screen assembly 38 in the direction of the aft end 22 of the hood enclosure 20. For example, as shown in FIG. 2, the hood enclosure 20 includes a pair of auxiliary screen assemblies 40 (one of which is shown) extending downward from the first and second side walls 36, 38 so as to define a bottom portion of the hood enclosure 20 along each of its sides. It should be appreciated that the auxiliary screen assembly 40 disposed on the opposed side of the hood enclosure 20 may generally be configured the same as the auxiliary screen assembly 40 shown in FIG. 2. However, in alternative embodiments, the auxiliary screen assembly(ies) 40 of the work vehicle 10 may be positioned at any other suitable location at which air may be drawn under and/or into the hood enclosure 20.

It should be appreciated that, as used herein, the term "screen" is used to describe any suitable structure that includes a plurality of screen openings for allowing air to enter and/or exit the hood enclosure 20 while preventing debris from passing therethrough. Thus, suitable screens may include, but are not limited to, mesh screens and/or various other suitable screens and/or grilles known in the art.

Figure 3:
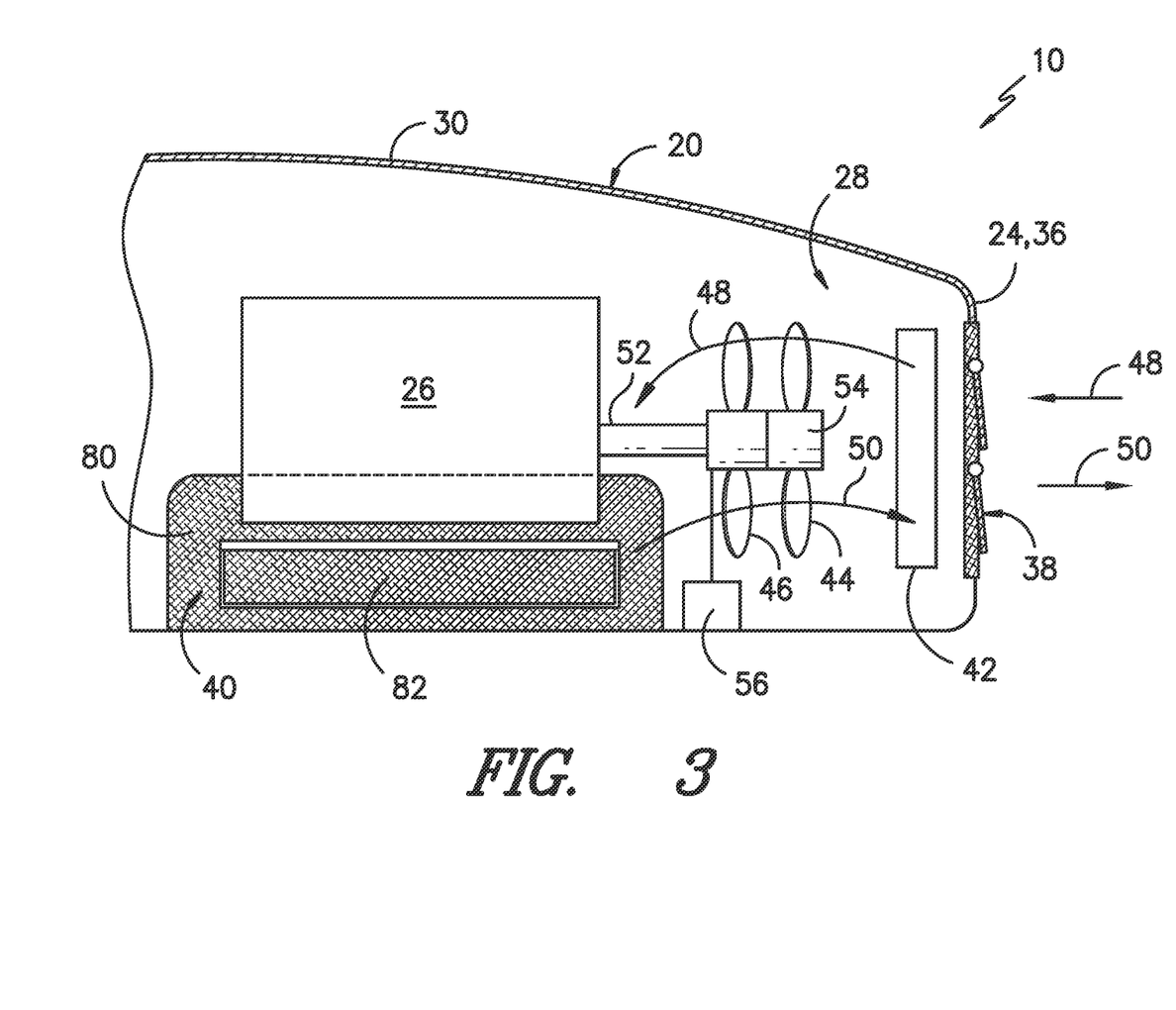
FIG. 3 illustrates a cross-sectional, internal side view of the hood enclosure shown in FIGS. 1 and 2, particularly illustrating one embodiment of a cooling system of the work vehicle.

Referring now to FIG. 3, a cross-sectional, internal side view of the hood enclosure 20 shown in FIGS. 1 and 2 is illustrated in accordance with aspects of the present subject matter, particularly illustrating one embodiment of the cooling system 28 of the work vehicle 10. As shown, the cooling system 28 of the work vehicle 10 may generally include one or more heat exchangers 42 disposed between the front screen assembly 38 and the engine 26. For example, as shown in the illustrated embodiment, the heat exchanger(s) 42 may be disposed directly behind the front screen assembly 38. As is generally understood, the heat exchanger(s) 42 may be configured to cool the engine fluid(s) and/or the other fluid(s) utilized during operation of the work vehicle 10 by transmitting such fluid(s) through a plurality of tubes having suitable heat transfer features (e.g., cooling fins, rods, coils and/or the like) so that heat is transferred from the fluid(s) to an airflow passing over and across the tubes. For instance, in several embodiments, the heat exchanger(s) 42 may comprise one or more radiators, intercoolers, fuel coolers, transmission fluid coolers, engine oil coolers and/or the like.

In addition, the cooling system 28 may also include one or more cooling fans 44, 46 for generating an airflow through the heat exchanger(s) 42. Specifically, in accordance with aspects of the present subject matter, the cooling fan(s) 44, 46 may be configured to generate a reversible airflow that is directed through the heat exchanger(s) 42 between the front and auxiliary screen assemblies 38, 40. For example, as shown in FIGS. 2 and 3, the fan(s) 44, 46 may be configured to generate an airflow in a first direction (indicated by arrows 48), wherein air is drawn into the hood enclosure 20 through the front screen assembly 38, is directed through the heat exchanger(s) 42 and exits through the auxiliary screen assemblies 40 along each side of the work vehicle 10, and a second direction (indicated by arrows 50), wherein air is drawn into the hood enclosure 20 through the auxiliary screen assemblies 40, is directed through the heat exchanger(s) 42 and exits through the front screen assembly 38.

As shown in FIG. 3, in several embodiments, the cooling system 28 may include first and second cooling fans 44, 46 disposed between the heat exchanger(s) 482 and the engine 26, with each fan 44, 46 being configured to be driven by an output shaft 52 of the engine 26. In general, the first cooling fan 44 may be configured to generate an airflow through the hood enclosure 20 in the first direction 58. For instance, in one embodiment, the blades of the first cooling fan 44 may be configured to have a suitable pitch such that, when the first cooling fan 44 is rotated by the output shaft 52, the cooling fan 44 pulls air into the front screen assembly 38 and through the heat exchanger(s) 42 and pushes the air out through the auxiliary screen assemblies 40. Additionally, the second cooling fan 46 may be configured to generate an airflow through the hood enclosure 20 that is directed in the second direction 50. For instance, in one embodiment, the blades of the second cooling fan 46 may be configured to have a suitable pitch such that, when the second cooling fan 46 is rotated by the output shaft 52, the second cooling fan 46 pulls air into hood enclosure 20 via the auxiliary screen assemblies 40 and pushes the air through the heat exchanger(s) 42 and out the front screen assembly 38.

Additionally, in several embodiments, the first and second cooling fans 44, 46 may be configured to be selectively engaged with and disengaged from the output shaft 52 of the engine 26 to permit each cooling fan 44, 46 to be rotated by the output shaft 52 independent of the other cooling fan 44, 46. For instance, as shown in FIG. 3, the first and second cooling fans 44, 46 may be coupled to the output shaft 52 via a coupling device 54. In general, the coupling device 54 may comprise any suitable device and/or combination of devices that is capable of permitting the cooling fans 44, 46 to be independently engaged with and disengaged from the output shaft 52. For example, in one embodiment, the coupling device 54 may comprise one or more electrical clutches and/or gear arrangements configured to independently engage/disengage the cooling fans 44, 46 with/from the output shaft 52.

Moreover, as shown in FIG. 3, the coupling device 54 may be communicatively coupled to a controller 56 of the work vehicle 10 to permit the coupling device 54 to automatically engage/disengage the cooling fans 44, 46 with/from the output shaft 52 based on signals transmitted from the controller 56. For instance, when it is desired to provide an airflow through the hood enclosure 20 in the first direction 48, the controller 56 may be configured to transmit a suitable control signal instructing the coupling device 54 to engage the first cooling fan 44 with the output shaft 52 and disengage the second cooling fan 46 from the output shaft 52. Similarly, when it is desired to provide an airflow through the hood enclosure 20 in the second direction 50, the controller 56 may be configured to transmit a suitable control signal instructing the coupling device 54 to engage the second cooling fan 46 with the output shaft 52 and disengage the first cooling fan 44 from the output shaft 52.

It should be appreciated that the controller 56 may generally comprise any suitable computer and/or other processing unit capable of controlling the operation of the cooling fans 44, 46 (e.g., by controlling the operation of the coupling device 54). Thus, the controller 656 may include one or more processor(s) and associated memory device(s) configured to perform any number of computer-implemented functions. Additionally, it should be appreciated that, in one embodiment, the controller 56 may form all or a portion of the overall control system of the work vehicle 10. Alternatively, the controller 56 may be configured as a separate controller specifically designed to control the operation of the cooling fans 44, 46.

It should also be appreciated that, in alternative embodiments, the first and second cooling fans 44, 46 need not be coupled coaxially with the output shaft 52. For instance, in one embodiment, the blades of each cooling fan 44, 46 may be mounted onto a separate fan shaft (not shown) extending generally parallel to the output shaft 52. In such an embodiment, the separate fan shaft of each cooling fan 44, 46 may be configured to be selectively engaged with and disengaged from the output shaft 52 via the coupling device 54 (e.g., by using a suitable clutch arrangement, gear arrangement, belt and pulley arrangement and/or the like) to permit the cooling fans 44, 46 to be independently rotated by the output shaft 52.

Additionally, in further embodiments, the cooling system 28 may only include a single cooling fan 44, 46 driven by the output shaft 52 of the engine 26. In such embodiments, the rotation of the cooling fan 44, 46 may be reversible to permit such fan 44, 46 to generate airflows in both the first and second directions 48, 50. For instance, the coupling device 54 may include a suitable clutch and reverse gear arrangement that permits rotation of the cooling fan 44, 46 to be reversed relative to the rotation of the output shaft 52. Alternatively, the cooling fan 44, 46 may be configured as a variable pitch fan having blades with adjustable pitches to allow the airflow through the hood enclosure 20 to be reversed without reversing the rotation of the cooling fan 44, 46. Such variable pitch fans are commercially available and are well known in the fan/propeller art.

Figure 4:
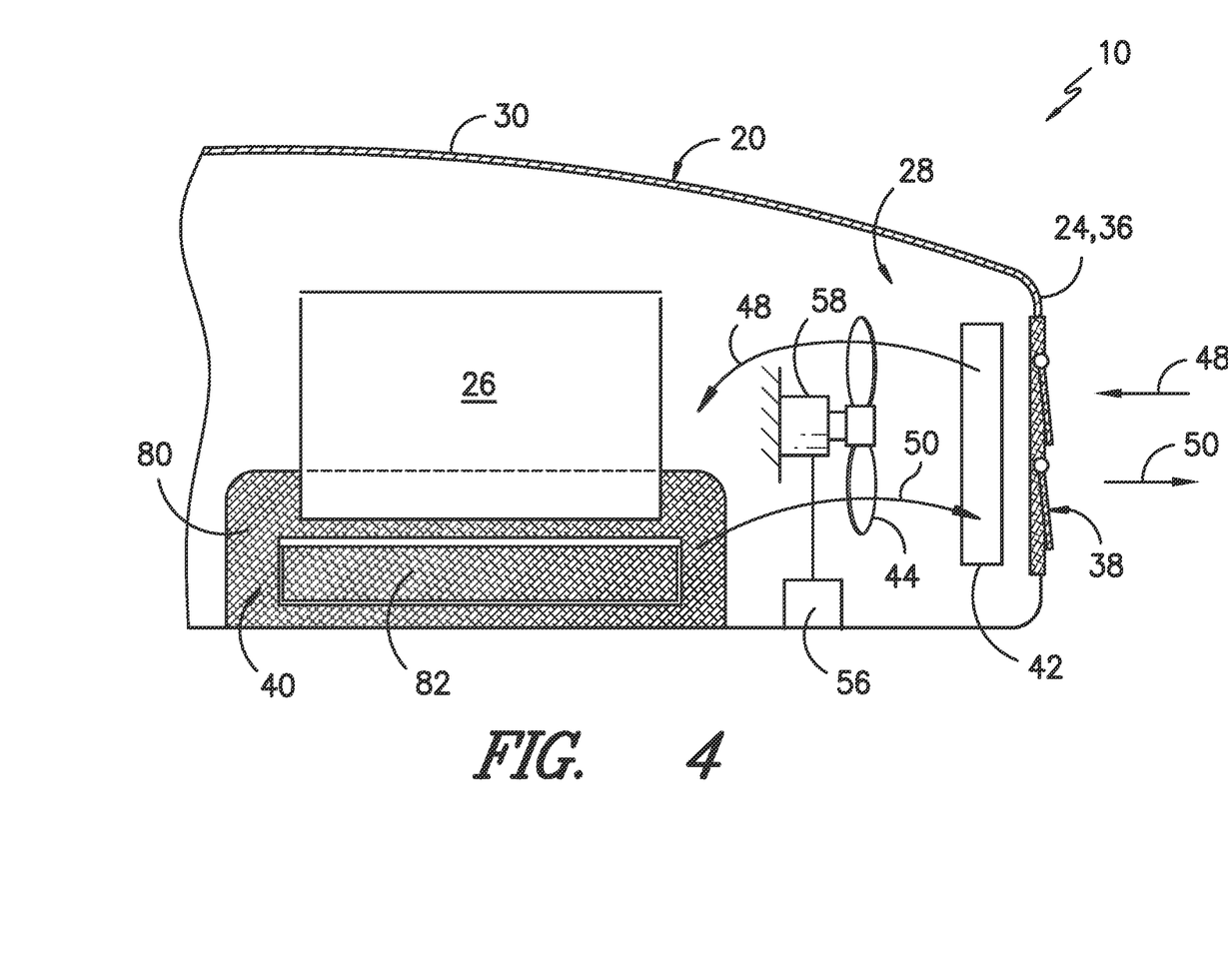
FIG. 4 illustrates a cross-sectional, internal side view of the hood enclosure shown in FIGS. 1 and 2, particularly illustrating another embodiment of a cooling system of the work vehicle.

Referring now to FIG. 4, a cross-sectional, internal side view of another embodiment of the hood enclosure 20 shown in FIGS. 1 and 2 is illustrated in accordance with aspects of the present subject matter, particularly illustrating another embodiment of the cooling system 28 of the work vehicle 10. As shown, unlike the embodiment shown in FIG. 3, the cooling fan(s) 44 may be driven by a drive source other than the engine 28, such as a separate drive motor 58 mounted to a suitable under-hood component of the work vehicle 10. In several embodiments, the drive motor 58 may comprise a reversible motor (e.g., a reversible electrical motor, a reversible hydraulic motor and/or the like) that is capable of rotating the cooling fan(s) 44 in both clockwise and counter-clockwise directions so that the direction of the airflow through the hood enclosure 20 may be reversed. Alternatively, the drive motor 58 may be configured to rotate the cooling fan(s) 44 in a single direction. In such an embodiment, the cooling fan(s) 44 and/or the drive motor 58 may have a similar arrangement to the embodiments described above with reference to FIG. 3, such as by coupling separate, differently pitched cooling fans 44 to the output shaft of the drive motor 58 via a coupling device 54 and/or by configuring the cooling fan(s) 44 as variable pitch fan(s). Additionally, similar to the embodiment described above, the drive motor 58 may be communicatively coupled to a controller 56 via a wired or wireless connection to allow the operation of the cooling fan(s) 44 to be controlled.

Figure 5:
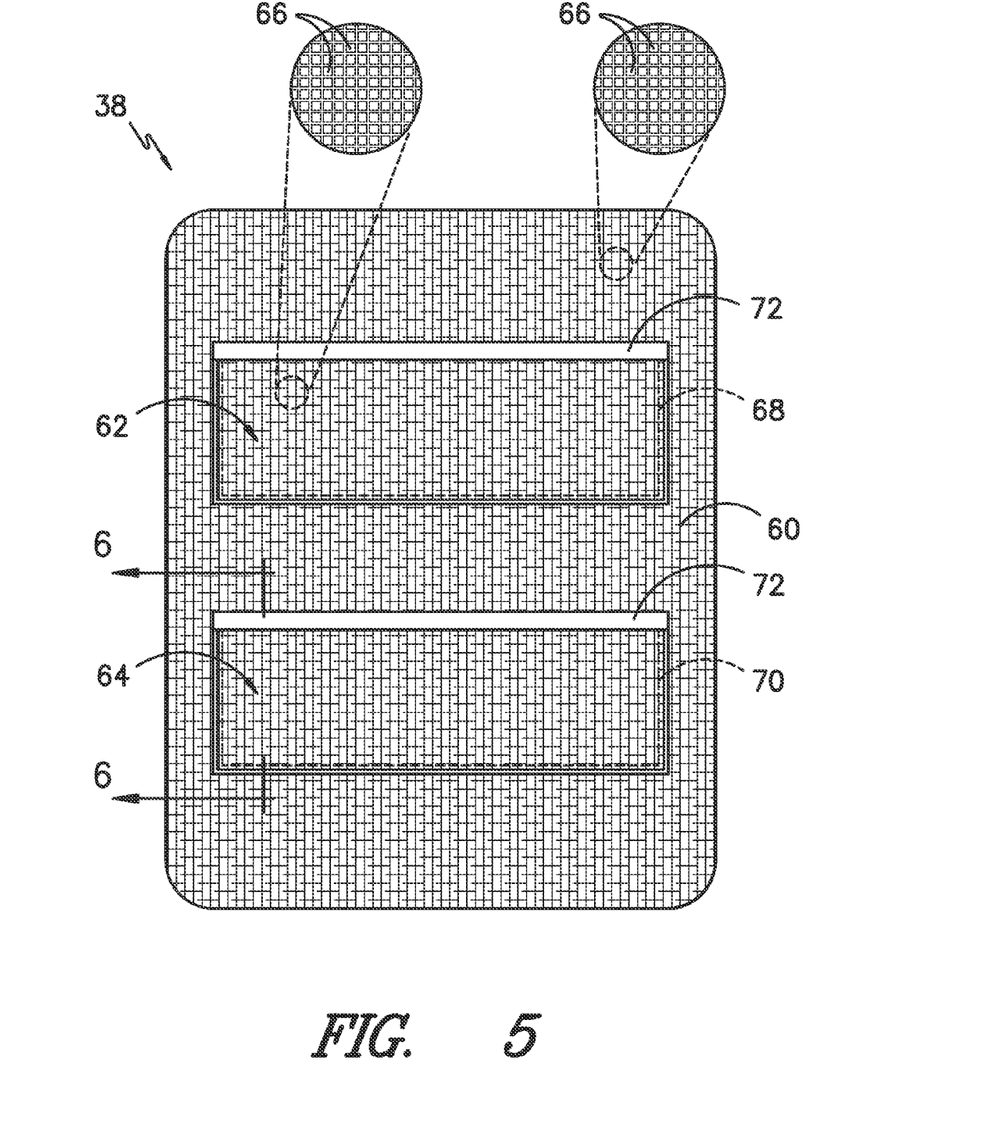
FIG. 5 illustrates a front view of a front screen assembly of the work vehicle shown in FIG. 1.
Figures 6, 7:
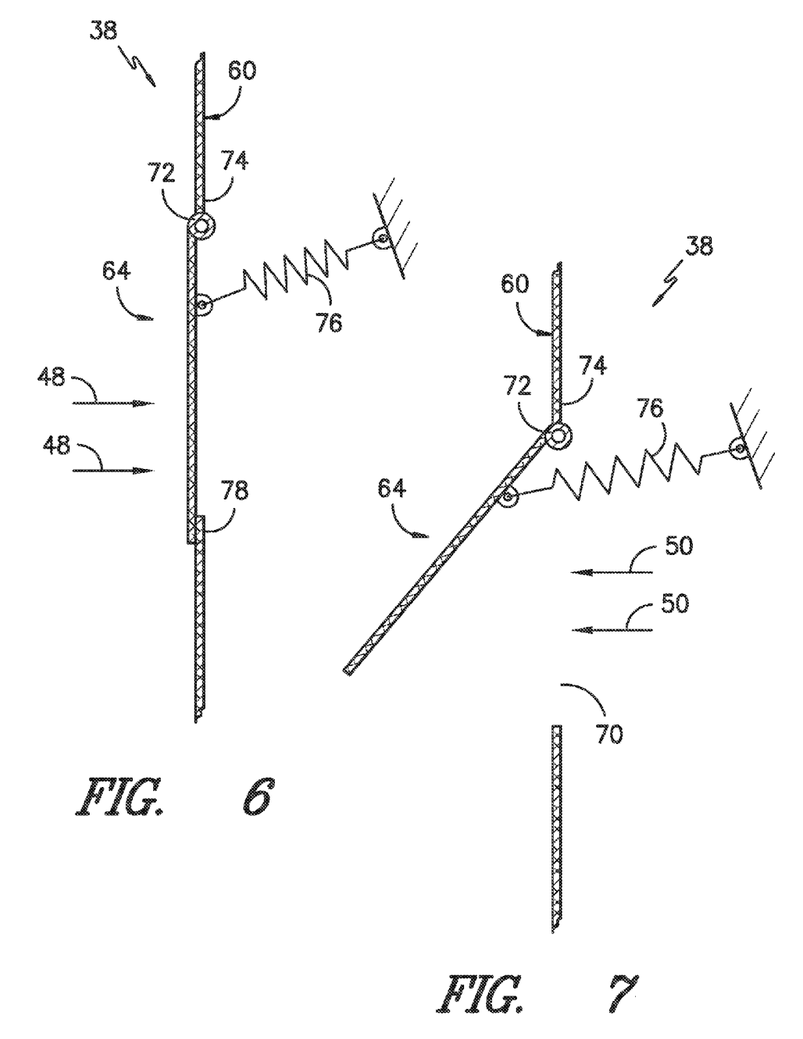
FIG. 6 illustrates a cross-sectional view of the front screen assembly shown in FIG. 5 taken about line 6-6, particularly illustrating a screen flap of the screen assembly in a closed position.
FIG. 7 illustrates another cross-sectional view of the front screen assembly shown in FIG. 5, particularly illustrating the screen flap in the opened position.

Referring now to FIGS. 5-7, various views of one embodiment of the front screen assembly 38 of the work vehicle 10 are illustrated in accordance with aspects of the present subject. Specifically, FIG. 5 illustrates a front view of the front screen assembly 38. FIG. 6 illustrates a cross-sectional view of the screen assembly 38 shown in FIG. 5 taken about line 6-6, particularly illustrating a screen flap 62, 64 of the screen assembly 38 in a closed position. Additionally, FIG. 7 illustrates another cross-sectional view of the screen assembly 38 shown in FIG. 5, particularly illustrating the screen flap 62, 64 in an opened position.

As shown in the illustrated embodiment, the front screen assembly 38 may generally include a front screen 60 and one or more movable screen flaps 62, 64 associated with the front screen 60. In general, the front screen 60 may be configured the same as or similar to any suitable vehicle grille/screen known in the art. For example, the front screen 60 may be configured as a wire mesh screen. Thus, the front screen 60 may generally define a plurality of screen openings 66 configured to allow an airflow to pass through the screen 60 (e.g., in both the first and second directions 48, 50). Additionally, the front screen 60 may be configured to define any suitable shape. For example, as shown in FIG. 5, the front screen 60 defines a generally rectangular shape. As such, the screen 60 may generally be configured to extend along all or a portion of the front wall 36 of the hood enclosure 20. However, in other embodiments, the screen 60 may define any other suitable shape. For instance, the screen 60 may define a semi-curved shaped such that the screen 60 wraps around the edges of the front wall 36 of the hood enclosure 20 and extends along a portion of each side wall 32, 34 of the hood enclosure 20.

Additionally, the screen flap(s) 62, 64 of the front screen assembly 38 may generally be configured to cover a flap opening 68, 70 defined in the screen 60. For example, as shown in the illustrated embodiment, the front screen 60 may define a first flap opening 68 and a second flap opening 70, with the first flap opening 68 being covered by a first screen flap 62 and the second flap opening 70 being covered a second screen flap 65. However, in other embodiments, the screen assembly 38 may include any other suitable number of screen flaps 62, 64 configured to cover any suitable number of flap openings 68, 70.

In several embodiments, each screen flap 62, 64 may be pivotally coupled to the screen 60 at or adjacent to its corresponding flap opening 68, 70. For example, as shown the illustrated embodiment, a hinge 72 may be coupled between the front screen 60 and each screen flap 62, 64 at a top edge 74 (FIGS. 6 and 7) of each flap opening 68, 70. However, in other embodiments, the screen flaps 62, 64 may be pivotally coupled to the front screen 60 using any other suitable hinged and/or pivotal attachment mechanism positioned generally at any suitable location around the flap openings 68, 70.

By pivotally coupling each screen flap 62, 64 to the front screen 60, the screen flaps 62, 64 may be configured to be moved relative to the screen 60 between a closed position (FIG. 6) and an opened position (FIG. 7), thereby allowing the screen flaps 62, 64 to be used to seal the hood enclosure 20 from any debris directed towards the front screen 60 from outside the work vehicle 20 and also vent any debris contained with the hood enclosure 20. For example, in several embodiments, the screen flaps 62, 64 may be configured to be moved to the closed position as air is sucked into the hood enclosure 20 in the first direction (indicated by arrows 48 in FIG. 6), thereby closing the flap openings 68, 70 and preventing debris located from entering the hood enclosure 20. However, when the airflow is reversed such that air is being directed in the second direction (indicated by arrows 50 in FIG. 7) out of the hood enclosure 20 via the front screen 60, the screen flaps 62, 64 may be configured to be moved to the opened position, thereby allowing any debris contained within the hood enclosure 20 to be expelled through the flap openings 68, 70.

In several embodiments, a biasing mechanism(s) 76 may be coupled to each screen flap 62, 64 in order to bias the screen flaps 62, 64 into the closed position or the opened position. For example, as shown in FIGS. 6 and 7, in one embodiment, a spring 76 may be coupled to each screen flap 62, 64 such that the screen flaps 62, 64 are biased into the closed position. In such an embodiment, when the airflow through the hood enclosure 20 is directed in the first direction 48, the screen flaps 62, 64 may be moved to the closed position due to the force applied by the spring 76. However, when the airflow is directed in the second direction 50, the pressure exerted on the screen flaps 62, 64 by the airflow may be sufficient to overcome the spring force, thereby moving the screen flaps 62, 64 to the opened position.

In another embodiment, the screen flaps 62, 64 may be configured to be passively actuated between the opened and closed positions without the need for any biasing mechanisms 76. For example, when the airflow is directed in the first direction 48, the gravitational force acting on the screen flaps 62, 64, along with the pressure of the airflow, may maintain the screen flaps 62, 64 in the closed position. However, when the airflow is directed in the second direction 50, the pressure of the airflow may be sufficient to overcome the gravitational force, thereby pushing the screen flaps 62, 64 to the opened position.

Alternatively, the screen flaps 62, 64 may be configured to be actively actuated between the opened and closed positions. For example, an electronically controlled actuator(s) (not shown) may be coupled to the screen flaps 62, 64 that is configured to actuate the flaps 62, 64 between the opened and closed positions, such as by coupling a motor to each screen flap 62, 64 at its hinge axis or by coupling a linear actuator to each screen flap 62, 64. In such an embodiment, the controller 56 may be configured to control the operation of both the cooling fan(s) 44, 46 and the actuator(s) such that, when the cooling fan(s) 44, 46 are generating an airflow in the first direction 48, the actuator(s) may move the screen flaps 62, 64 to the closed position and vice versa.

It should be appreciated that, in several embodiments, the screen flaps 62, 64 may be configured to be dimensionally larger than the flap openings 68, 70 such that when in the closed position, each screen flap 62, 64 overlaps the front screen 60 around a portion of the perimeter of each flap opening 68, 70. For example, as shown in FIG. 6, the screen flaps 62, 64 may be configured to overlap the front screen 60 along a bottom edge 78 of each flap opening 68, 70, thereby sealing the flap openings 68, 70 from debris along their bottom edges 78.

Additionally, in accordance with aspects of the present subject matter, the each auxiliary screen assembly 40 described above with reference to FIG. 2 may include an auxiliary screen 80 and one or more auxiliary screen flaps 82 associated with the auxiliary screen 80. For example, as shown in FIG. 2, the auxiliary screen assembly 40 includes a single auxiliary screen flap 82 configured to cover a corresponding flap opening (not shown) defined in the auxiliary screen 80. However, in other embodiments, the auxiliary screen assembly 40 may include any other suitable number of auxiliary screen flaps 82 configured to cover any suitable number of flap openings defined in the auxiliary screen 80.

It should be appreciated that the auxiliary screen 80 may generally be configured the same as or similar to the front screen 60 described above. For example, the auxiliary screen 80 may be configured as a wire mesh screen or any other suitable screen/grille and, thus, may define a plurality of screen openings 66 (FIG. 5) configured to allow an airflow pass through screen 80. However, the auxiliary screen 80 may be shaped differently from the front screen 60 due to its different positioning along the hood enclosure 20. For example, as shown in FIG. 2, a top portion of the auxiliary screen 80 may be shaped so as to match the contour of the bottom portion of the first or second sidewall 32, 34 of the hood enclosure 20 while a bottom portion of the auxiliary screen 80 may be curved inwardly in order to seal the bottom of the hood enclosure 20 against a portion the vehicle chassis 12. Of course, in other embodiments, the auxiliary screen 80 may be configured to define any other suitable shape.

Moreover, the auxiliary screen flap(s) 82 may generally be configured the same as or similar to the screen flaps 62, 64 described above. For example, the auxiliary screen flap(s) 82 may be pivotally coupled to the auxiliary screen 80 (e.g., using a suitable hinge) at the associated flap opening(s). As such, the auxiliary screen flap(s) 82 may be configured to be moved relative to the auxiliary screen 80 between an opened position and a closed position. However, contrary to the screen flaps 62, 64, the auxiliary screen flaps 82 may be configured to be opened when the airflow through the hood enclosure 20 is directed in the first direction 48 and closed when the airflow is directed in the second direction 50. Specifically, in several embodiments, the auxiliary screen flap(s) 82 may be configured to be moved to the opened position as air is sucked into the hood enclosure 20 through the front screen 60 and pushed out of the hood enclosure 20 via the auxiliary screen 80, thereby allowing any debris contained within the hood enclosure 20 to be expelled out the flap opening(s) associated with the auxiliary screen 80. However, when the airflow is reversed such that air is being directed in the second direction 50 (i.e., into the auxiliary screen 80, through the heat exchanger(s) 42 and out the front screen 60), the auxiliary screen flap(s) 82 may be configured to be moved to the closed position, thereby sealing the flap opening(s) associated with the auxiliary screen 80 and preventing debris located outside the work vehicle 10 form entering the hood enclosure 20.

It should be appreciated that, similar to the screens 60, 80, the disclosed screen flaps 62, 64, 82 may be configured as wire mesh screens and/or any other suitable screens/grilles known in the art. Thus, as shown in FIG. 5, the screen flaps 62, 64, 82 may each define a plurality of screen openings 66 configured to allow an airflow to pass through the screen flaps 62, 64, 82 (e.g., in both the first and second directions 48, 50).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A screen assembly for a work vehicle, the screen assembly comprising:
   a screen defining a plurality of screen openings for receiving an airflow therethrough, the screen further defining a flap opening;
   a flap pivotally coupled to the screen at the flap opening, the flap being configured to be moved to a closed position when the airflow through the screen is in a first direction and to an opened position when the airflow through the screen is in a second direction, wherein the second direction is opposite the first direction,
   wherein an outer edge of the flap is configured to contact at least a portion of the screen around a perimeter of the flap opening when the flap is in the closed position.

2. The screen assembly of claim 1, further comprising a hinge coupled between the screen and the flap at a top edge of the flap opening.

3. The screen assembly of claim 2, wherein the flap is dimensionally larger than the flap opening in at least one direction.

4. The screen assembly of claim 1, further comprising a biasing mechanism coupled to the flap, the biasing mechanism being configured to bias the flap into the closed position.

5. The screen assembly of claim 4, wherein the biasing mechanism is coupled to the flap at a location spaced apart from a pivot point defined between the flap and the screen.

6. The screen assembly of claim 1, wherein the screen is configured as a front screen or an auxiliary screen of the work vehicle.

7. A work vehicle, comprising:
   a hood enclosure extending between a forward end and an aft end;
   a front screen disposed at the forward end of the hood enclosure;
   a heat exchanger positioned behind the front screen;
   a fan configured to generate an airflow in both a first direction, wherein air is drawn into the hood enclosure through the front screen and flows through the heat exchanger, and a second direction opposite the first direction, wherein air is directed through the heat exchanger and out of the hood enclosure through the front screen; and
   a flap movable relative to the front screen between a closed position and an opened position, the flap configured to be in the closed position when the airflow is directed in the first direction and in the opened position when the airflow is directed in the second direction, the flap moving in a direction away from the heat exchanger as the flap transitions from the closed position to the opened position,
   wherein the front screen defines a flap opening, the flap being pivotally coupled to the front screen at the flap opening.

8. The work vehicle of claim 7, further comprising a hinge coupled between the front screen and the flap at a top edge of the flap opening.

9. The work vehicle of claim 7, wherein the flap is dimensionally larger than the flap opening in at least one direction such that the flap overlaps at least a portion of the screen around a perimeter of the flap opening when the flap is in the closed position.

10. The work vehicle of claim 7, further comprising a biasing mechanism coupled to the flap, the biasing mechanism being configured to bias the flap into the closed position.

11. The work vehicle of claim 10, wherein the biasing mechanism is coupled to the flap at a location spaced apart from a pivot point defined between the flap and the screen.

12. A work vehicle, comprising:
   a hood enclosure extending between a forward end and an aft end;
   a front screen disposed at the forward end of the hood enclosure;
   a heat exchanger positioned behind the front screen;

a fan configured to generate an airflow in both a first direction, wherein air is drawn into the hood enclosure through the front screen and flows through the heat exchanger, and a second direction opposite the first direction, wherein air is directed through the heat exchanger and out of the hood enclosure through the front screen;

a flap movable relative to the front screen between a closed position and an opened position, the flap configured to be in the closed position when the airflow is directed in the first direction and in the opened position when the airflow is directed in the second direction, the flap moving in a direction away from the heat exchanger as the flap transitions from the closed position to the opened position;

an auxiliary screen spaced apart from the front screen in the direction of the aft end of the hood enclosure; and an auxiliary flap movable relative to the auxiliary screen, the auxiliary flap configured to be in an opened position when the airflow is directed in the first direction and a closed position when the airflow is directed in the second direction.

13. A work vehicle, comprising:

a hood enclosure extending between a forward end and an aft end;

a screen assembly coupled to the hood enclosure, the screen assembly including:
 a screen defining a plurality of screen openings for receiving an airflow therethrough;
 a flap movable relative to the screen;
 a hinge coupled between the flap and the screen; and
 a biasing mechanism coupled to the flap at a location spaced apart from the hinge, the biasing mechanism being configured to bias the flap into a closed position; and a fan configured to generate an airflow in both a first direction, wherein air is drawn into the hood enclosure through the screen and a second direction opposite the first direction, wherein air is expelled from the hood enclosure through the screen, wherein the flap is configured to be in the closed position when the airflow is directed through the screen in the first direction and an opened position when the airflow is directed through the screen in the second direction.

14. The work vehicle of claim 13, wherein the screen assembly is disposed at the forward end of the hood enclosure.

15. The work vehicle of claim 13, wherein the screen assembly is disposed aft of the forward end of the hood enclosure.

16. The work vehicle of claim 13, wherein the screen defines a flap opening, the flap being pivotally coupled to the screen at the flap opening.

17. The work vehicle of claim 16, wherein the hinge is coupled between the front screen and the flap at a top edge of the flap opening.

18. The work vehicle of claim 16, wherein the flap is dimensionally larger than the flap opening in at least one direction such that the flap overlaps at least a portion of the screen around a perimeter of the flap opening when the flap is in the closed position.

* * * * *